(12) United States Patent
Ethington, Jr.

(10) Patent No.: US 7,427,411 B2
(45) Date of Patent: Sep. 23, 2008

(54) DRIED, FULL-FAT CORN GERM AS A RUMINANT FEED COMPONENT

(75) Inventor: Reed T. Ethington, Jr., Dodge City, KS (US)

(73) Assignee: Archer-Daniels-Midland Company, Decatur, IL (US)

( * ) Notice: Subject to any disclaimer, the term of this patent is extended or adjusted under 35 U.S.C. 154(b) by 664 days.

(21) Appl. No.: 10/273,404

(22) Filed: Oct. 18, 2002

(65) Prior Publication Data

US 2003/0113430 A1 Jun. 19, 2003

Related U.S. Application Data

(60) Provisional application No. 60/334,869, filed on Oct. 18, 2001.

(51) Int. Cl.
*A23K 1/17* (2006.01)
*A23K 1/18* (2006.01)

(52) U.S. Cl. .............. 424/442; 426/2; 426/807

(58) Field of Classification Search ......... 424/400–402, 424/625, 442; 426/635, 312, 627, 2, 807
See application file for complete search history.

(56) References Cited

U.S. PATENT DOCUMENTS

| | | | | |
|---|---|---|---|---|
| 3,840,670 | A | * | 10/1974 | Holt .............................. 426/41 |
| 4,495,207 | A | * | 1/1985 | Christianson et al. ....... 426/312 |
| 6,022,566 | A | * | 2/2000 | Miller ............................. 426/2 |
| 6,060,519 | A | * | 5/2000 | Inglett ........................... 516/77 |
| 6,726,941 | B2 | * | 4/2004 | Ethington et al. ............... 426/2 |
| 2002/0028283 | A1 | * | 3/2002 | Freeman ..................... 426/635 |

OTHER PUBLICATIONS

"Toasted Full Fat Corn Germ" <<http://www.soonsoonoil.com.my/p_general.asp>> Soon Soon Oilmills (May 2000).*
"Toasted Full Fat Corn Germ," <<http://www.soonsoonoil.com.my/p¯general.asp>>, Soon Soon Oilmills SDN, 1 page (May 2000).
Drouillard, J.S., et al., "Performance and Carcass Characteristics of Finishing Steers Fed Dried, Full-Fat Corn Germ," in *2002 Cattlemen's Day*, Kansas State University Department of Animal Science & Industry, ed., Kansas State University Agricultural Experiment Station and Cooperative Extension Service, Manhattan, KS, pp. 23-26 (Feb. 2002) available online at <<http://www.oznet.ksu.edu/library/lvstk2/samplers/srp890.asp>>.
Miller, W.F., et al., "Comparative Value of Full-Fat Corn Germ, Whole Cottonseed, and Tallow as Energy Sources for Lactating Dairy Cows," in *Dairy Day 2002*, Stevenson, J., ed., Kansas State University Agricultural Experiment Station and Cooperative Extension Service, Manhattan, KS, pp. 60-65 (Nov. 2002) available on line at <<http://www.oznet.ksu.edu/library/lvstk2/samplers/SRP898.asp>.
"Full Fat Corn Germ," <<http://www.soonsoonoil.com.my/p_general.asp>>, Soon Soon Oilmills SDN, 1 page (May 2000).

* cited by examiner

*Primary Examiner*—Michael G. Hartley
*Assistant Examiner*—Micah-Paul Young
(74) *Attorney, Agent, or Firm*—Craig G. Cochenour; Duane A. Stewart, III; Buchanan Ingersoll & Rooney PC

(57) ABSTRACT

A non-human animal feed composition comprising from about 10% to about 20% dried, full-fat corn germ, and methods of using the same are disclosed.

12 Claims, 3 Drawing Sheets

DRIED, FULL-FAT CORN GERM AS A RUMINANT FEED COMPONENT

CROSS-REFERENCE TO RELATED APPLICATIONS

This application claims benefit of priority to U.S. Provisional Application No. 60/334,869, filed Oct. 18, 2001, which application has been incorporated by reference in its entirety.

STATEMENT REGARDING REFERALLY-SPONSORED RESEARCH AND DEVELOPMENT

Not applicable.

REFERENCE TO MICROFICHE APPENDIX/SEQUENCE LISTING/TABLE/COMPUTER PROGRAM LISTING APPENDIX

Not applicable.

BACKGROUND OF THE INVENTION

1. Field of the Invention

The present invention relates to non-human animal feed compositions and methods. More specifically, the present invention relates to use of full-fat corn germ in non-human animal feed compositions and methods. Even more specifically, the present invention relates to use of full-fat corn germ in ruminant feed and compositions.

2. Background Information

The use of fats and oils in animal feed is well known. For example, fats and oils are commonly added to finishing diets to increase energy density and to improve efficiency of gain in feedlot cattle. However, utilization of liquid fats and oils is generally limited to feeding operations that have invested in suitable equipment, such as pumps and heated storage tanks. Full-fat corn germ is a viable alternative to liquid fat sources, particularly when specialized handling and storage equipment is not available.

Corn germ is a high-fat byproduct that is recovered during the process of producing corn sweeteners, fuel ethanol and/or other corn products. Wet milling of corn involves steeping and coarse grinding resulting in a pulp-like material containing full-fat corn germ, hull, starch, and gluten. Full-fat corn germ can then be separated based on bulk density via a liquid cyclone separator. Normally, further processing of full-fat corn germ by pressing, expeller, or solvent procedures to recover corn oil takes place resulting in concurrent production of corn germ meal in which the fat content is greatly reduced. Alternatively, however, during the corn milling process, wet germ can be recovered and dried to a final moisture content of 3% to 5%. The dried, full-fat corn germ typically contains between 43% and 54% fat, and 12% to 15% protein on a dry matter basis. While the use of various corn products in animal feed is well known, previously the corn germ used in animal feed was the corn germ meal that remains after the oil is removed. Dried, full-fat corn germ is a free-flowing byproduct that can be handled easily using conventional bins, augers, and pneumatic conveying systems. Dried, full-fat corn germ has a bulk density of 22 to 26 lb/ft$^3$, and, as a result of its low moisture content, can be stored for extended periods without risk of oxidative rancidity.

SUMMARY OF THE INVENTION

The present invention relates to a non-human animal feed composition comprising from about 0.1% to about 25% dried, full-fat corn germ. In one embodiment, the present invention provides a non-human animal feed composition comprising from about 5% to about 25% dried, full fat corn germ. In a more preferred embodiment the present invention provides a non-human animal feed composition comprising from about 10% to about 20% dried, full fat corn germ. In another preferred embodiment, the present invention provides a non-human animal feed composition comprising from about 15% to about 20% dried, full fat corn germ.

DETAILED DESCRIPTION OF THE INVENTION

Figure 1:
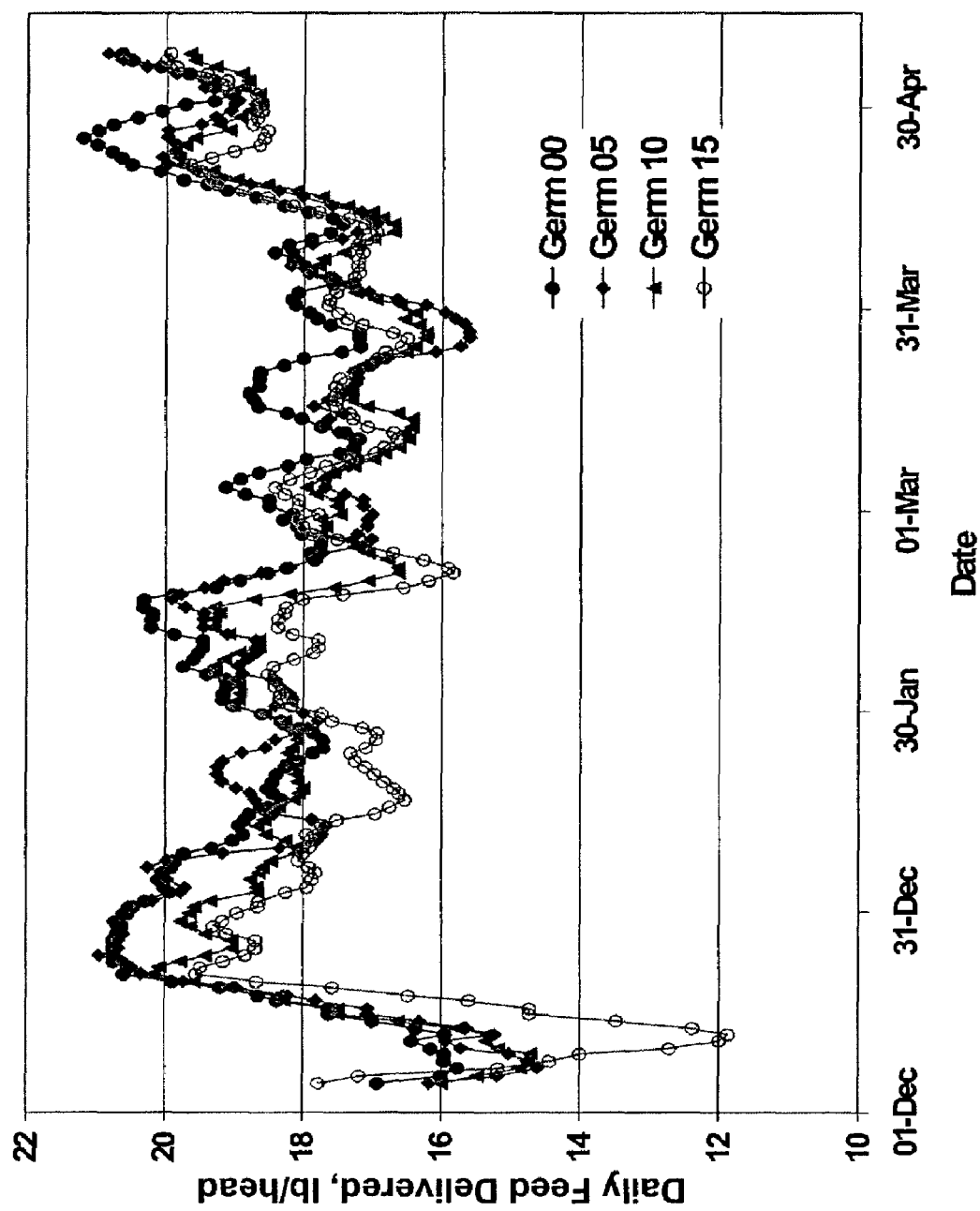
FIG. 1 shows daily feed deliveries for yearling steers fed diets containing 0%, 5%, 10%, or 15% full-fat corn germ.

The present invention relates to a non-human animal feed composition comprising from about 0.1% to about 25% dried, full fat corn germ. In one embodiment, the present invention provides a non-human animal feed composition comprising from about 5% to about 25% dried, full fat corn germ. In a more preferred embodiment the present invention provides a non-human animal feed composition comprising from about 10% to about 20% dried, full fat corn germ. In another preferred embodiment, the present invention provides a non-human animal feed composition comprising from about 15% to about 20% dried, full fat corn germ.

It may also be desirable to include other components in the animal feed composition of the present invention including, but not limited to, dry rolled corn, wet corn gluten feed, alfalfa hay, corn steep liquor, dehulled soybean meal, limestone, salt, vitamin/mineral premix, corn ground, whole cottonseed, cottonseed hulls, cottonseed meal, fish meal, molasses, tallow, magnesium oxide, trace mineralized salt, sodium bicarbonate, selenium, and nutrients.

The present invention further provides a method of feeding a non-human animal, said method comprising providing to said non-human animal a non-human animal feed composition comprising from about 0.1% to about 25% dried, full fat corn germ. In a preferred embodiment, the method of the present invention comprises providing to said non-human animal a non-human animal feed composition comprising from about 5% to about 25% dried, full fat corn germ. In another preferred embodiment, the method of the present invention comprises providing to said non-human animal a non-human animal feed composition comprising from about 10% to about 20% dried, full fat corn germ. In another preferred embodiment, the method of the present invention comprises providing to said non-human animal a non-human animal feed composition comprising from about 15% to about 20% dried, full fat corn germ.

In a preferred embodiment, the non-human animal is a ruminant including, but not limited to, cattle, sheep, and goats. In a more preferred embodiment, the ruminant is a beef steer or dairy cow. Furthermore, the feed composition of the present invention may be provided to other non-human animals including, but not limited to, swine, poultry, dogs, and cats, as well as other livestock or pets.

The present invention also provides methods of modifying various performance and carcass characteristics of ruminants which include, but are not limited to, feed intake, liver abscess incidence, daily weight gain, feed efficiency, dressing percentage, diet energy density, yield grade, quality grade, marbling, incidence of dark cutters, $12^{th}$ rib fat thickness, ribeye area, percentage of kidney, pelvic, and heart fat, and milk production. In one embodiment, a method of the present invention results in decreases in liver abscess incidence. In another embodiment, a method of the present invention results in increases in daily weight gain, feed efficiency, dressing percentage, and diet energy.

The corn germ in the animal feed composition of the present invention may be wet or dried. In one embodiment the corn germ of the present invention is dried. In a preferred embodiment, the corn germ of the present invention has a moisture content of from about 3% to about 15%. In another embodiment, the corn germ of the present invention has a moisture content of from about 3% to about 6%. In yet another embodiment, the corn germ of the present invention has a moisture content of from about 13% to about 20%.

The animal feed composition of the present invention may also be used to regulate consumption control in non-human animals, particularly in free-choice and pasture feeding situations. Such a use of the present invention is of unexpected benefit to those who raise and care for non-human animals in that the feed composition of the present invention allows animals to self-regulate feed intake, and results in less frequent feeding of the animals.

The animal feed composition of the present invention may also be used to increase levels of conjugated linoleic acid in the milk of dairy cows. Conjugated linoleic acids have been shown to reduce incidence of cancer.

All patents and publications referred to herein are expressly incorporated by reference. Having now generally described the invention, the same will be more readily understood through reference to the following Examples which are provided by way of illustration, and are not intended to be limiting of the present invention, unless specified.

EXAMPLES

Example 1

Three hundred and fifty-eight crossbred yearling steers with an average initial weight of 701 lb were used in a feeding experiment conducted at the Kansas State University Beef Cattle Research Center in Manhattan, Kans. Steers were blocked by previous dietary regimen and assigned randomly, within blocks, to each of four dietary treatments (Table 1). Steers were assigned to dirt-surfaced pens containing 12 to 16 animals each, with a total of six pens per treatment. Pens provided approximately 175 ft$^2$ surface area per head. Using a common series of transition diets, steers were stepped up from a concentrate level of 60% to a final concentrate level of 97% (equivalent to the 0% germ diet, Table 1) over a period of 18 days. Steers were then weighed, implanted with Synovex® Plus (Growth implant with 200 mg trembolone acetate and 28 mg estadiol benzoate; Ford Dodge Animal Health, Division of American Home Products Corp), returned to their pens, and placed onto their respective dietary treatments in December of 2000. Bunks were read at 7:00 a.m., and rations were fed once daily at approximately 9:00 a.m. throughout the 155-day finishing period. Feed deliveries were recorded daily, and compositional analyses of ration ingredients were performed weekly. Dry matter intake was corrected to reflect feed refusals that were removed from the bunks throughout the course of the experiment. At the end of the finishing period, each pen was weighed prior to being loaded and transported to a commercial slaughter facility in Emporia, Kans. Hot carcass weight and incidence of liver abscesses were recorded on the day of slaughter. Yield grade, quality grade, marbling, incidence of dark cutters, $12^{th}$ rib fat thickness, ribeye area, and percentage of kidney, pelvic and heart fat were recorded following a 24-hour chill.

Data were analyzed as a randomized complete block design using the General Linear Models Procedure of the Statistical Analysis System. Previous nutritional regimen and the level of corn germ were included in the model as fixed effects, and feedlot pen was used as the statistical unit. Least-squares means for each treatment were compared using orthogonal linear and quadratic contrasts.

Growth performance, feed consumption, and carcass characteristics of steers fed varying levels of corn germ are shown in Table 1. Adding corn germ to the diet had a quadratic effect ($P=0.02$) on daily gain. The maximal rate of growth was achieved when germ was included at 10% of the diet dry matter and decreased slightly when additional germ was added. Feed intake decreased linearly ($P=0.02$) as the proportion of germ in the diet was increased. Efficiency improved dramatically (Linear, $P<0.01$; Quadratic $P=0.04$) with addition of germ to the diet. Relative to cattle fed no germ, gain efficiencies were improved by 8%, 11%, and 9% for cattle fed diets containing 5%, 10%, and 15% corn germ, respectively. During the first several weeks of the experiment, feed intake was dramatically lower for cattle fed the high level (15%) of corn germ in comparison to the other diets (FIG. 1). This suggests that the shift from 0% to 15% germ on day 1 of the experiment was too abrupt, and that a more gradual transition to the high level may have been beneficial. These steers ultimately acclimated themselves to the high level of germ, as their intakes during the final 60 days of the experiment were approximately equal to those of steers fed the other diets.

Adding corn germ to the diet also had a significant impact on the incidence of liver abscesses. Cattle fed the control diet were more or less typical with 8.8% liver abscesses, whereas the treatments that included germ were 2.3% or less. Generally speaking, a higher incidence of liver abscesses would be anticipated when fat level in the diet increases due to the propensity for lower ruminal pH. This could potentially be attributed to indirect effects of corn germ on feed intake, or possibly to a direct effect of corn oil on bacteria that cause liver abscess.

Dressing percentage tended ($P=0.08$) to increase in a quadratic manner as the level of germ in the diet was increased from 0% to 15%. Dressing percentage peaked with 5% or 10% germ in the diet, and was slightly lower for cattle fed 15% germ. Adding corn germ to the diets of finishing steers also increased fat deposition, as indicated by changes in subcutaneous fat thickness, KPH, and USDA Yield Grade. These factors indicate that cattle fed corn germ simply finish more quickly due to greater energy intake and that the length of the finishing period should be adjusted accordingly.

In summary, including full-fat corn germ in the diets of finishing cattle provides a viable means of improving diet energy density, daily gain, and feed efficiency. Furthermore, it can be handled readily in conventional storage systems, and is relatively stable over extended storage intervals. Adding germ to finishing diets at 10% or less of dry matter can be done without incident. However, higher levels of inclusion may require gradual transitions to avoid exaggerated feed intake depression.

TABLE 1

Diet composition (% of dry matter).

| | Dried Full-Fat Corn Germ, % of Diet Dry Matter | | | |
|---|---|---|---|---|
| Ingredient | 0 | 5 | 10 | 15 |
| Dry-rolled corn | 51.02 | 46.27 | 41.53 | 36.80 |
| Wet corn gluten feed | 35 | 35 | 35 | 35 |
| Alfalfa hay | 3 | 3 | 3 | 3 |
| Full-fat corn germ, dried | 0 | 5 | 10 | 15 |
| Corn steep liquor | 6 | 6 | 6 | 6 |
| Dehulled soybean meal | .79 | .53 | .27 | 0 |
| Limestone | 1.50 | 1.50 | 1.50 | 1.50 |
| Salt | .30 | .30 | .30 | .30 |
| Vitamin/mineral premix[a] | 2.39 | 2.39 | 2.39 | 2.39 |
| Crude protein, actual % | 13.00 | 13.03 | 13.05 | 13.07 |
| Crude fat, actual % | 3.9 | 6.2 | 8.4 | 10.7 |

[a]Formulated to provide .1 ppm cobalt, 10 ppm copper, .6 ppm iodine, 60 ppm manganese, .25 ppm selenium, 60 ppm zinc, 1,200 IU/lb vitamin A, 300 mg/day Rumensin, and 90 mg/day Tylosin.

TABLE 2

Performance and carcass characteristics of finishing steers fed diets containing 0%, 5%, 10%, or 15% dried full-fat corn germ.

| | Dried Full-Fat Corn Germ, % of DM | | | | P-Value | |
|---|---|---|---|---|---|---|
| Item | 0 | 5 | 10 | 15 | Linear | Quadratic |
| Number of head (pens) | 92(6) | 91(6) | 88(6) | 87(6) | — | — |
| Initial weight, lb | 701.3 | 703.7 | 694.3 | 706.3 | .83 | .40 |
| Final weight, lb | 1140.4 | 1166.4 | 1161.0 | 1161.1 | .17 | .16 |
| Daily gain, lb (carcass adjusted)[a] | 2.83 | 2.99 | 3.01 | 2.93 | .11 | .02 |
| Dry matter intake, lb/day | 18.80 | 18.34 | 18.04 | 17.80 | .02 | .71 |
| Feed: gain[a] | 6.63 | 6.13 | 5.99 | 6.06 | <.01 | .04 |
| Liver abscess, % | 8.77 | 2.15 | 2.08 | 2.32 | .02 | .05 |
| Dressing percentage | 61.25 | 61.81 | 61.89 | 61.69 | .14 | .08 |
| Hot carcass weight, lb | 718.4 | 734.9 | 731.4 | 731.5 | .17 | .16 |
| 12th rib fat thickness, in | .31 | .33 | .35 | .36 | .04 | .81 |
| Kidney, pelvic & heart fat, % | 1.86 | 1.98 | 2.07 | 2.12 | <.01 | .43 |
| USDA Choice & Prime, % | 35.9 | 42.8 | 36.4 | 46.4 | .24 | .74 |
| USDA Select, % | 57.8 | 49.4 | 58.0 | 48.1 | .37 | .88 |
| USDA Standard, % | 5.3 | 4.5 | 5.6 | 5.5 | .85 | .86 |
| Dark cutter, % | 1.04 | 3.27 | 0.00 | 0.00 | .11 | .20 |
| USDA Yield Grade | 1.70 | 1.76 | 1.92 | 1.92 | .04 | .71 |

[a]Average daily gain and efficiency were determined using carcass adjusted final weights. Final live weight in these calculations was computed as hot carcass weight divided by a common dress of 63%.

Example 2

24 multiparous Holstein cows (averaging 124 DIM, milked 2x) were used in a 4×4 Latin square design with cows housed in a tie-stall barn and offered diets for ad libitum intake twice daily over four 28-day periods. Experimental diets (Table 3) were: 1) control (C) 3.5% fat, 2) whole cottonseed (WCS) 5.1% fat, 3) tallow (T) 5.1% fat, 4) full-fat corn germ (FFCG) 5.1% fat. Diets were offered as total mixed rations (TMR). Samples of TMR and feed refusals were taken weekly and dried at 105° C. to determine dry matter of diets. Alfalfa hay, corn silage, whole cottonseed, and grain mixes were sampled and composites by period were sent to Northeast DHI Forage Testing Lab, Ithaca, N.Y. for analysis. Cottonseed meal and cottonseed hulls were included in the C, T, and FFCG diets to balance for fiber and protein fractions with the WCS diet. Individual feed intake and milk yield were recorded daily. Weekly milk samples (a.m., p.m. composite) were analyzed for fat, protein, lactose, urea nitrogen (MUN), and somatic cells by Heart of America DHI Laboratory, Manhattan, Kans. Individual body weights were obtained on two consecutive days at the beginning of the study and at the end of each period following the a.m. milking. Body condition was scored at the beginning of the study and at the end of each period.

Figure 2:
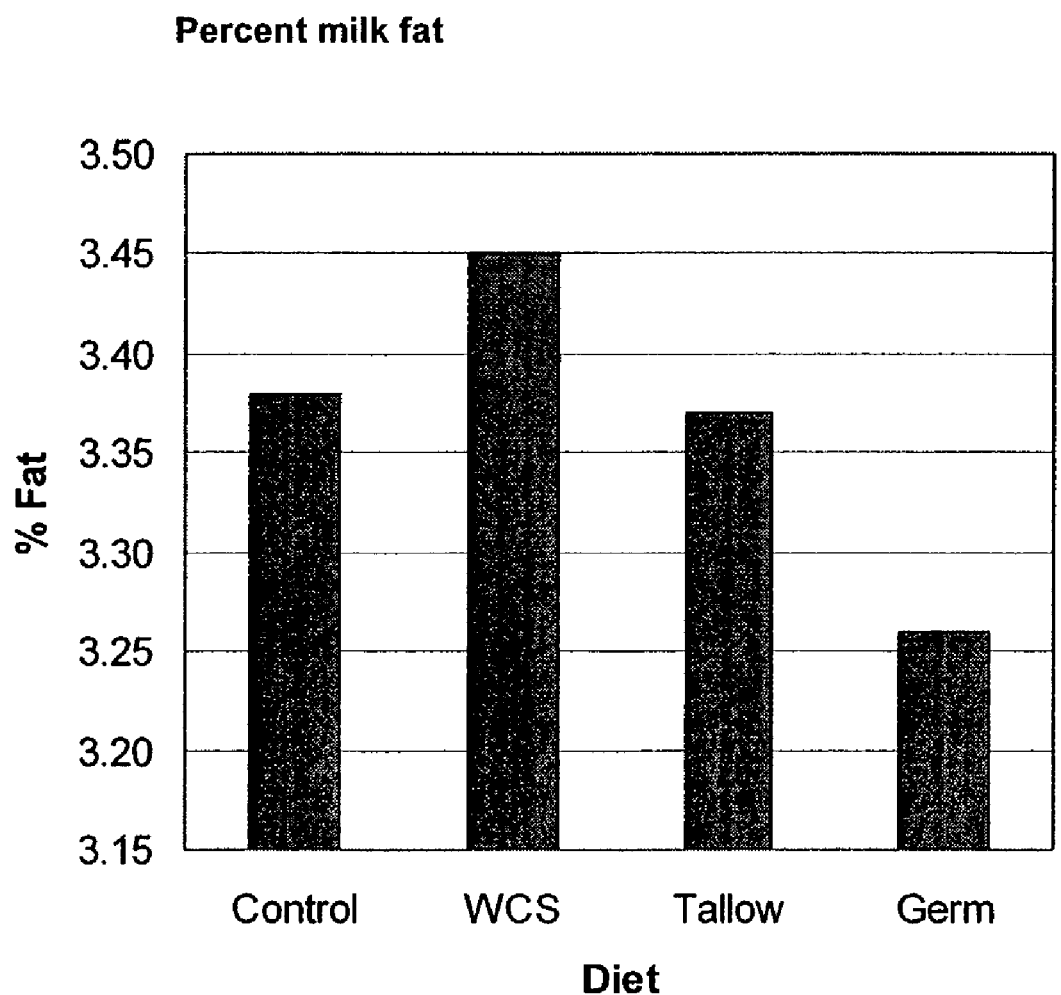
FIG. 2 shows the percent milk fat in cows fed control diets, and diets containing whole cotton seed (WCS), tallow, and full-fat corn germ.
Figure 3:
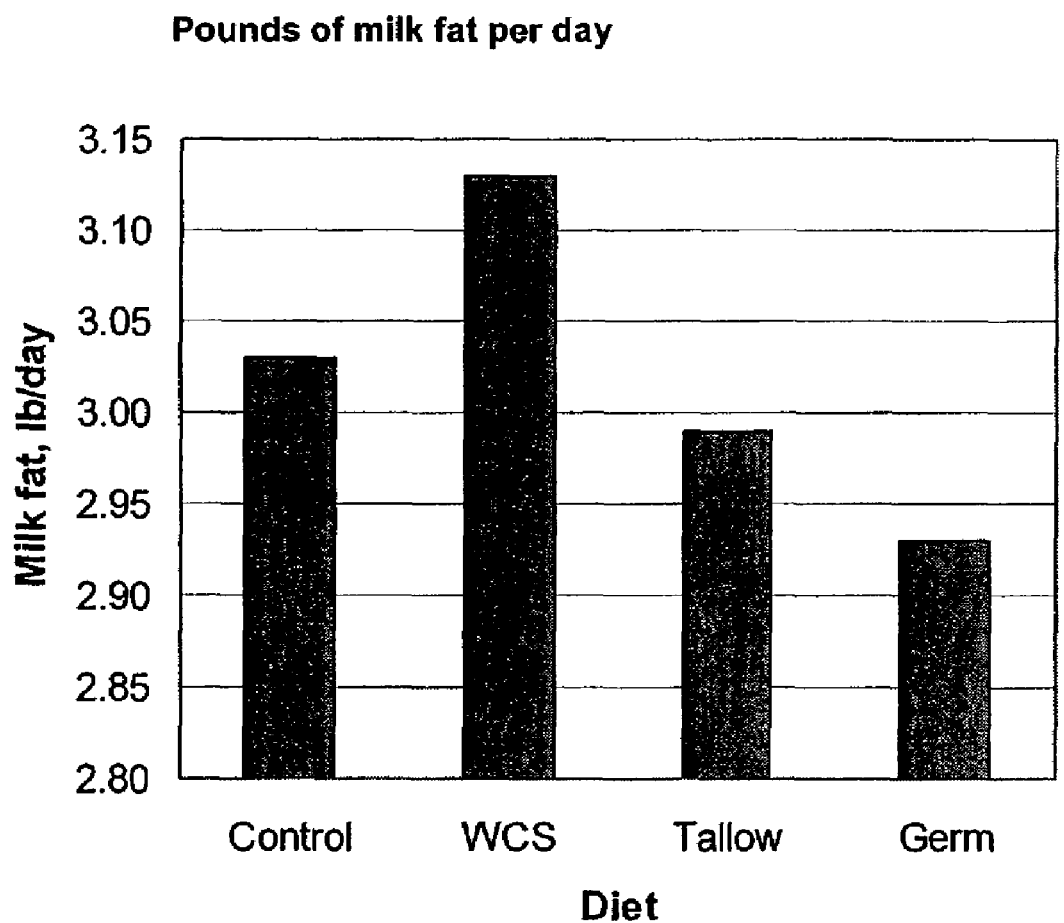
FIG. 3 shows the pounds of milk fat per day in cows fed control diets, and diets containing whole cotton seed (WCS), tallow, and full-fat corn germ.

Dry matter intake, milk yield, ECM, lactose percent, protein and lactose yield and SCC did not differ among the diets. Efficiency of milk production was improved by the addition of fat from WCS but not from T or FFCG when compared to cows fed C. Cows fed FFCG had lower milk fat percent ($P<0.05$) and fat yield ($P<0.05$) than cows fed WCS, but similar to cows fed C and T (FIGS. 2 and 3). Milk protein percent ($P<0.05$), but not yield, was higher for cows fed C compared to those fed diets containing the three fat sources. Urea nitrogen concentration was lower in milk from cows consuming FFCG and T than in milk from cows fed WCS but not those fed C.

Milk fat depression in lactating dairy cows can result from a deficiency of lipid precursors delivered to the mammary tissue for milk fat synthesis and inhibition of milk fat synthesis by mammary tissue. Adding supplemental fat to the diet can depress ruminal fiber degradation, most notably when polyunsaturated fatty acids, such as linoleic acid (a long chain polyunsaturated fatty acid of plants) are fed. Dietary fat sources rich in saturated fatty acids, such as tallow, typically do not have the same negative effect on the rumen environment or milk fat synthesis by the mammary tissue. Lipid is metabolized in the rumen by two major microorganisms, *Butyrivibrio fibriosolvens* and *Anaerovibrio lipolytica*. Triglycerides are first hydrolyzed to free fatty acids then unsaturated fatty acids are hydrogenated to form to saturated fatty acids by bacteria. Hydrolysis of triglycerides by bacteria and protozoa occurs rapidly in the rumen, whereas biohydrogenation by bacteria is gradual, which leads to ruminal accumulation of polyunsaturated long chain fatty acids that are toxic to fiber digesting bacteria and protozoa. Dietary fats, such as oils, are able to envelop fiber particles and bacteria which further reduces fiber degradation in the rumen. This reduction in fiber digestion reduces the availability of acetate for de novo synthesis of fat by the mammary gland.

Rumen bacteria possess an isomerase enzyme that changes the position of the double bond within linoleic acid and other unsaturated fatty acids subsequently generating conjugated linoleic acid (CLA) and trans fatty acids (trans-11 and trans-10). Trans-11(vaccenic acid) comprises greater than 80% of the trans fatty acids and can be transformed into cis-9, trans-11 CLA by desaturase enzyme activity within the mammary gland, thus increasing the CLA content of milk. The trans-10 isomer is transformed into trans-10, cis-12 CLA. The trans-10 isomer and trans-10, cis-12 CLA can inhibit milk fat synthesis by mammary tissue resulting in depressed milk fat percentage and yield. Lipids from intact seeds, such as WCS, release oil slowly in the rumen which probably reduces the ruminal concentration of CLA and trans fatty acids, thus reducing the potential to depress de novo fatty acid synthesis in mammary tissue. Efficiency in dairy cows is estimated by dividing milk yield by dry matter intake (ECM/DMI) which provides a measure of utilization of feedstuffs for milk production. Characteristically, lactating dairy cows fed diets supplemented with fat, such as T or WCS, produce milk more efficiently due to the increased caloric content of the diet. Historically, lactating dairy cows supplemented with fat show improved lactation performance over cows fed diets without supplemental fat. Cows fed WCS produced milk more efficiently than cows fed C, T, or FFCG, but, we did not observe an improvement in efficiency for cows that consumed T compared to cows that consumed C. The lack of response to tallow was unexpected.

The handling and storage characteristics of full-fat corn germ make it a desirable dairy cattle feedstuff. Full-fat corn germ supported milk production as well as WCS and T.

TABLE 3

Ingredient and nutrient composition of experimental diets.

| | Diet | | | |
|---|---|---|---|---|
| Item | Control | Whole cottonseed | Tallow | Full-fat corn germ |
| | % of DM | | | |
| Ingredient | | | | |
| Alfalfa hay | 23.05 | 23.01 | 23.00 | 23.08 |
| Corn silage | 9.94 | 9.92 | 9.92 | 9.95 |
| Wet corn gluten feed | 19.43 | 19.40 | 19.39 | 19.46 |
| Corn ground | 28.42 | 26.87 | 26.89 | 25.74 |
| Whole cottonseed | — | 9.44 | — | — |
| Tallow | — | — | 1.67 | — |
| Full fat corn germ | — | — | — | 3.64 |
| Cottonseed hulls | 3.31 | — | 3.30 | 3.30 |
| Cottonseed meal | 4.49 | — | 4.48 | 3.52 |
| Soybean meal, expeller[1] | 6.99 | 6.98 | 6.98 | 6.98 |
| Fish meal | 1.30 | 1.30 | 1.30 | 1.30 |
| Molasses | 0.97 | 0.97 | 0.96 | 0.90 |
| Limestone | 0.66 | 0.70 | 0.68 | 0.68 |
| Magnesium oxide | 0.21 | 0.21 | 0.21 | 0.21 |
| Trace mineralized salt | 0.31 | 0.31 | 0.31 | 0.31 |
| Sodium bicarbonate | 0.73 | 0.73 | 0.73 | 0.73 |
| Vitamin ADE premix | 0.12 | 0.12 | 0.12 | 0.12 |
| Selenium premix | 0.01 | 0.01 | 0.01 | 0.01 |
| Zinpro 4-plex ™[2] | 0.05 | 0.05 | 0.05 | 0.05 |
| Nutrient[3] | | | | |
| CP | 18.9 | 18.7 | 18.7 | 18.7 |
| NDF | 29.7 | 30.0 | 29.5 | 29.9 |
| ADF | 16.3 | 17.0 | 16.2 | 16.3 |
| NFC | 42.9 | 41.1 | 41.7 | 41.3 |
| Fat | 3.5 | 5.1 | 5.1 | 5.1 |
| Calcium | 0.89 | 0.91 | 0.90 | 0.90 |
| Phosphorus | 0.45 | 0.45 | 0.45 | 0.45 |
| $NE_L$, Mcal/lb | 0.71 | 0.74 | 0.73 | 0.73 |

[1]Soybest ™ - Grain States Soya Inc., West Point, NE
[2]Zinpro 4-plex - Zinpro Inc., Eden Prairie, MN
[3]Values from Dairy NRC 2001

TABLE 4

Lactation performance of cows.

| | Diet | | | |
|---|---|---|---|---|
| Item | Control | Whole cottonseed | Tallow | Full-fat corn germ |
| $DMI^1$, lbs/day | 57.3 | 56.3 | 56.5 | 57.3 |
| Milk, lbs/day | 90.2 | 90.8 | 89.8 | 91.0 |
| $ECM^2$, lbs/day | 88.7 | 90.0 | 87.7 | 87.6 |
| Efficiency, ECM/DMI | 1.55$^a$ | 1.60$^b$ | 1.56$^a$ | 1.54$^a$ |
| Milk fat, % | 3.38$^a$ | 3.45$^a$ | 3.37$^{a1}$ | 3.26$^b$ |
| Milk protein, % | 3.09$^a$ | 3.06$^b$ | 3.05$^b$ | 3.06$^b$ |
| Milk lactose, % | 5.29 | 5.26 | 5.25 | 5.29 |
| Milk fat, lbs/day | 3.03$^a$ | 3.13$^a$ | 2.99$^b$ | 2.93$^b$ |
| Milk protein, lbs/day | 2.77 | 2.76 | 2.72 | 2.76 |
| Milk lactose, lbs/day | 4.77 | 4.78 | 4.72 | 4.81 |
| $SCC^3$, x1000 | 254.0 | 429.0 | 431.0 | 287.0 |
| Milk urea nitrogen, mg/dl | 16.64$^a$ | 17.11$^a$ | 16.29$^b$ | 16.30$^b$ |
| Initial body condition score | 2.69 | 2.75 | 2.72 | 2.74 |
| Initial body weight, lbs | 1542 | 1547 | 1536 | 1540 |
| Change in body weight, lbs | 29.9 | 16.2 | 28.8 | 34.1 |

$^{a,b}$Means with different superscripts differ (P < 0.05);
[1]DMI = dry matter intake,
[2]ECM = energy corrected milk,
[3]SCC = somatic cell count. Control = 3.5% ether extract; Whole cottonseed, Tallow, Full-fat corn germ = 5.1% ether extract.

Example 3

Preliminary results from a beef feedlot trial compare full fat corn germ against a control diet, a diet that is iso-fat, with tallow being the fat source, against a 10% germ diet, with an additional diet of 15% full fat corn germ. These diets also have normal vitamin E levels and then all diets have a high level of vitamin E. Other research has shown that Vitamin E might reduce the feed intake depression that is typical for high fat diets. Vitamin E appears to show some benefit for the high germ diets. Benefits include a product that is free flowing, easy to handle and animal product free of all vegetable fat, which is desirable for some applications.

Example 4

Preliminary results in two separate beef cattle studies with full-fat corn germ as a pasture supplement are favorable. Benefits include that the full-fat corn germ is fed to the livestock on a free-choice bases, and the animals self-regulate feed intake. This is a major benefit to the livestock producer as they are able to fill the feeder once per week instead of having to make daily trips to each location to deliver feed. Animal performance is also improved as measured by daily rate of gain for animals fed full-fat corn germ.

Example 5

Full-fat corn germ is fed to beef animals in a pasture situation to determine effectiveness in improving reproductive efficiency in these animals. Previous studies show that vegetable oils such as that in corn germ are very effective in improving reproductive rates in beef cattle under range conditions. Full-fat corn germ is very easy and cost effective for the beef producer to utilize, and also is shown to allow animals to self-regulate feed intake.

Example 6

Digestibility of full fat corn germ from two different drying systems is determined in dairy cattle. One plant uses a fluid bed dryer, which is a low temperature drying method, while a second plant uses steam tube dryers that heat the germ to much higher temperatures. Earlier research using fistulated animals indicated that the germ from a fluid bed dryer was similar in rumen digestibility to that of freeze dried germ, while germ from a steam tube dryer had rumen digestibility reduced or possibly bypassed. The current trial utilizes fistulated and duodenal canulated animals to determine actual digestibility of the different corn germs.

Also in this study, fatty acid components of milk, especially the conjugated linoleic acid (CLA) portion of the profile are determined after feeding full-fat corn germ. CLA's are proven to reduce the incidence of cancer, and may be increased in the milk of cows fed full-fat corn germ.

Example 7

Feed trials with non-ruminant animals including growing pigs, gestating and lactating sows, and growing turkeys show corn germ is a viable feedstuff.

Having now fully described the present invention in some detail by way of illustration and example for purposes of clarity of understanding, it will be obvious to one of ordinary skill in the art that the same can be performed by modifying or changing the invention with a wide and equivalent range of conditions, formulations and other parameters thereof, and that such modifications or changes are intended to be encompassed within the scope of the appended claims.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. A feed composition comprising from about 0.1% to about 25% dried, full fat corn germ, dry rolled corn, wet corn gluten feed, alfalfa hay, corn steep liquor, dehulled soybean meal, limestone, salt, and vitamin/mineral premix.

2. A method of feeding a non-human animal, said method comprising providing to said non-human animal the feed composition of claim 1.

3. The method of claim 2, wherein said non-human animal is a ruminant.

4. The method of claim 3, wherein said ruminant is selected from the group consisting of a beef steer and a dairy cow.

5. A method of modifying feed intake, liver abscess incidence, weight gain, feed efficiency, dressing percentage, diet energy density or performance and carcass characteristics in a ruminant, said method comprising providing to said ruminant a non-human animal feed composition comprising from about 0.1% to about 25% dried, full-fat corn germ, dry rolled corn, wet corn gluten feed, alfalfa hay, corn steep liquor, dehulled soybean meal, limestone, salt, and vitamin/mineral premix.

6. The method of claim 5, wherein said performance and carcass characteristics are selected from the group consisting of yield grade; quality grade; marbling; incidence of dark cutters; 12th rib fat thickness; ribeye area; and percentage of kidney, pelvic, and heart fat.

7. The method of claim 5, wherein said feed composition comprises from about 15% to about 20% dried, full-fat corn germ.

8. The method of claim 5, wherein said ruminant is selected from the group consisting of a beef steer and a dairy cow.

9. The feed composition of claim 1, wherein the dried, full-fat corn germ includes a moisture content of from about 3% to about 20%.

10. The feed composition of claim 1, comprising about 10% to about 20% dried, full-fat corn germ.

11. The feed composition of claim 1, comprising about 15% to about 20% dried, full-fat corn germ.

12. The method of claim 5, wherein said feed composition comprises from about 15% to about 20% dried, full-fat corn germ.

* * * * *